Oct. 28, 1930.  D. H. SPICER  1,779,566

AUTOMATIC TIRE INFLATING MECHANISM

Filed June 19, 1929

Inventor
Delphin H. Spicer
By Hull, Brock & West
Attorney

Patented Oct. 28, 1930

1,779,566

UNITED STATES PATENT OFFICE

DELPHIN H. SPICER, OF LAKEWOOD, OHIO

AUTOMATIC TIRE-INFLATING MECHANISM

Application filed June 19, 1929. Serial No. 371,976.

This invention relates generally to automatic tire inflating mechanism and more particularly to automatic valve opening means for the tire inflater.

In certain types of tire inflaters which are secured to the wheel or other portion of a vehicle to continually pump air into tires when the vehicle is operating and when the pressure in the tires is below a certain predetermined limit there is usually some means provided to hold the valve of the tire open.

The inflater is necessarily constructed so that it will not force air into the tire after a certain pressure is reached, so that when the tire is inflated to near the maximum pressure the difference in pressure in the tire and the discharge tube from the inflater is too small to open the valve in the tire, and it is essential that some means is provided for unseating the tire valve if the desired pressure in the tire is to be maintained.

In cases where the vehicle is not used for long periods of time the air will leak out of the tire through the pumping mechanism of the inflater to such an extent that the tire must be inflated by other means, before the car can be put in operation to allow the automatic inflater to again function to bring the tire up to the desired pressure.

It is the object of my invention to provide means for holding the valve of the tire open when the tire inflater is in operation but which permits the valve to close when the vehicle is standing or when the tire inflater is not functioning.

A further object is to provide automatic valve opening means for vehicle tires which may be used with any type of tire inflater which operates while the vehicle is moving.

Figure 1:
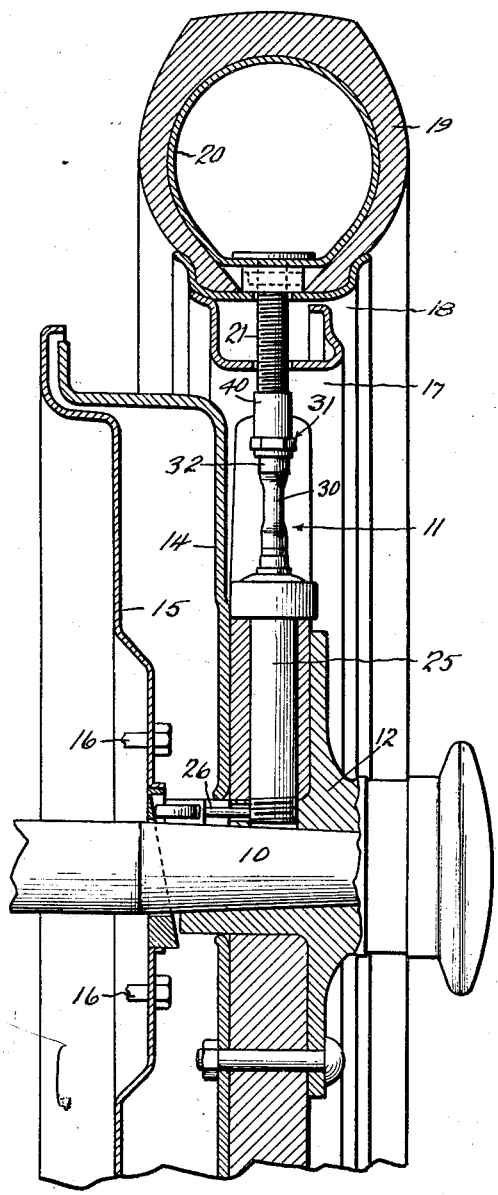
Figure 2:
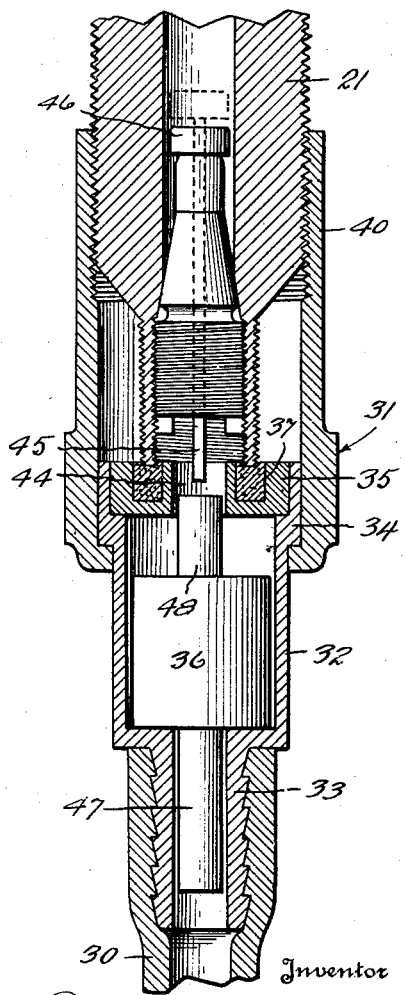

In the accompanying drawings Fig. 1 is a sectional detail view of a vehicle wheel provided with a tire inflater with which the valve opening device is used, and Fig. 2 is a sectional detail view of the valve opening mechanism attached to the end of a tire valve.

In describing my invention reference is made to the accompanying drawing in which like reference numerals are used to designate like parts in the several views.

I have shown in Fig. 1 a tire inflater of my invention with which the automatic valve opening mechanism may be used. The inflater illustrated is described in detail in my copending application No. 362,829, filed May 13, 1929. Since the specific structure of the inflater mechanism is immaterial as far as the invention disclosed in this case is concerned, a more detailed disclosure of such inflater in this application is believed to be unnecessary.

In Fig. 1, the reference numeral 10 designates the rear or driving axle of an automobile having rigidly secured to its outer end a wheel 11 the hub of which is indicated at 12. To the inside of the wheel 11 is secured the usual brake drum 14, and closing the brake drum is the cover plate 15 which in the usual construction is secured by bolts 16 to the rear axle housing (not shown). On the felly 17 of the wheel is mounted in the usual manner the demountable rim 18 which carries the tire 19 encasing the tube 20 from which the valve stem 21 of conventional form projects.

In the hub 12 of the wheel is secured a tire inflater or pump 25 the pumping mechanism of which is operated by a reciprocating rod 26 operating on a cam member 27 secured rigidly to the closure plate 15.

The pump or tire inflater 25 is connected to the valve stem 21 of the tire by a flexible conduit 30, the outer end of which is provided with a coupling unit designated generally by the reference numeral 31.

The coupling unit 31 comprises a tubular member 32 provided at one end with a tubular extension 33 of less diameter than the member 32, over which extension the flexible conduit 30 engages. The opposite end of the tubular member 32 is enlarged as at 34 and is counterbored to receive a washer member 35 which is pressed therein constituting a retainer for a weight member 36 which is slidably received in the bore of the tubular member 32. On its outer face the washer 35 is provided with an annular groove in which is received a gasket 37 against which the end of the valve 21 bears. An internally threaded sleeve member 40 rotatably received on the member 32 and provided at its end with a flange 41 which engages the enlarged end 34 thereof, fits over the outer end of the valve stem 21 engaging the threads thereon whereby the coupling may be drawn into tight engagement with the valve stem.

The washer member 35 is provided with a central aperture 44 into which the release stem 45 of the valve 46 normally housed in the valve stem 21 extends.

The weight 36 which is longitudinally slidable in the member 32 is provided at its opposite ends with centrally arranged integral extensions 47 and 48 which are slidably received in the bore of the extension 30 and aperture 44 respectively.

The diameters of the extensions 47 and 48 are sufficiently less than the diameter of the openings in which they are received and the weight 36 fits sufficiently loose in the bore of the tubular member 32 so that air from the tube 30 will pass through the coupling into the valve stem 21.

The mass of the weight member 36 is such that when the vehicle is traveling at or above a predetermined speed the centrifugal force of the weight member together with the pressure of the air from the inflater 25 is sufficient to hold the valve 46 open and permit the air to flow into the tire until a predetermined pressure is reached, when the inflater 25 no longer forces air into the tube 30.

When the vehicle is standing still, the valve will of course remain closed since even if the weight 36 is resting on the stem 45 it is not heavy enough to open it, or at such times when the air inflater 25 is not operating due to some mechanical difficulty, the centrifugal force of the weight member 36 alone is not sufficient to open the valve up to the normal operating speed of the vehicle.

It will be seen that with the automatic valve opener, the valve of the tire need not be held open when the vehicle is not in use, so that the tire will not go flat due to any leakage through the inflater when the vehicle stands idle over long periods of time.

Having thus described my invention, what I claim is:—

1. In combination with a vehicle wheel and a pneumatic tire mounted thereon having a valve stem with a valve therein, a tire inflater adapted to operate and pump air into the tire when the vehicle is being operated, a coupling unit for connecting the tire inflater to said valve stem, and means in said unit adapted to operate continuously when the wheel is being rotated to open said valve, but only when the wheel is being rotated at such a speed that the centrifugal force exerted by said means is sufficient to overcome the resistance to the opening of the valve.

2. Automatic valve opening means for tire inflaters, comprising a coupling unit adapted to be attached to the valve stem of a tire, said unit having a chamber, a weight member slidably received in said chamber and adapted to contact with the release rod of the tire valve and to operate under centrifugal force to assist in opening such valve.

3. In a unit for connecting a tire inflater to the valve stem of a tire, a tubular member having an enlarged bore intermediate its ends, one end of said tubular member being adapted for attachment to a tire inflater, the other end of said member being provided with a gasket, and means for clamping the member securely to a valve stem, a weight member in said enlarged bore free to move longitudinally therein, said weight member having a reduced end portion, said end portion being arranged to contact with the release rod of the valve in the valve stem and to operate under centrifugal force, when the wheel on which the unit may be secured is rotated, to open said valve.

In testimony whereof, I hereunto affix my signature.

DELPHIN H. SPICER.